June 2, 1959  F. W. TURNBULL  2,888,783

MOLD FOR APPLYING ENAMEL

Filed Feb. 12, 1953

Inventor
Frederick W. Turnbull

United States Patent Office 2,888,783
Patented June 2, 1959

2,888,783
MOLD FOR APPLYING ENAMEL
Frederick W. Turnbull, Chevy Chase, Md.
Application February 12, 1953, Serial No. 336,597
4 Claims. (Cl. 49—92.5)

This invention relates to a means of applying enamel to the cut-off ends of internally enameled pipe and relates to a pipe fitting and the method of making pipe joints with enamel lined pipes where it is desirable to present a continuous coating to the contents of the pipe.

Metallic pipes will not withstand contact with many corrosive fluids. Methods and means to coat the interior of metal pipes with a glass-like porcelain enamel have been devised. Enamel or "glass" lined pipe is obtainable commercially, the lining materials being broadly the same as the vitreous enamel used as a lining in hot water tanks, and as a protective coating on stoves, refrigerators, cooking utensils and plumbing fixtures. Specific materials are exemplified by "Glass Alloy" made by Pfaulder Company and "Perma Glass" made by A. O. Smith Company.

Upon cutting off the ends of such pipes, the bare metal is exposed and it has heretofore been impossible to make pipe joints using such pipe which would not allow the content of the pipe to contact the raw edge of the pipe at the joint. It is self-evident that when the ends of two sections of pipe are carefully dressed, butted and secured with any known pipe fitting, there will remain a crack into which the corrosive material in the pipe may creep and cause a failure of the joint by eating away the metal underneath the lining.

According to the invention disclosed herein, the raw ends of pipe may be coated, and a pipe joint may be made which will present a continuous porcelain or enamel surface to the contents of the pipe, pipe joints, or other fixtures.

Figure 4:
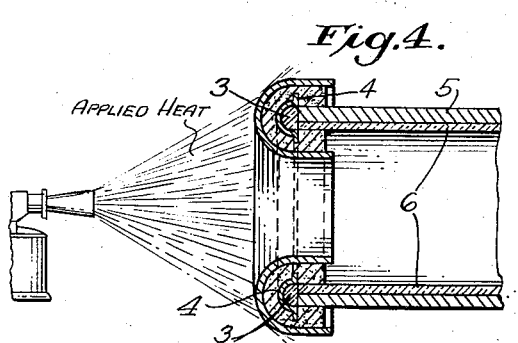
Figure 5:
Figure 6:
Figure 7:
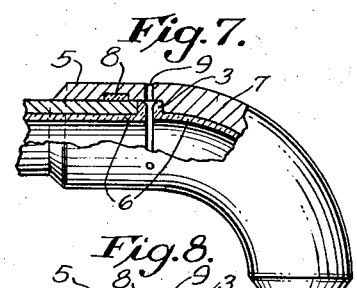
Figure 8:
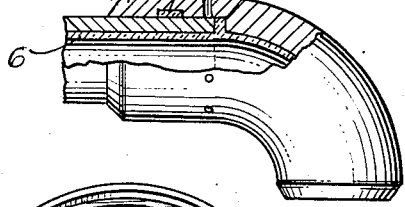
Figure 10:
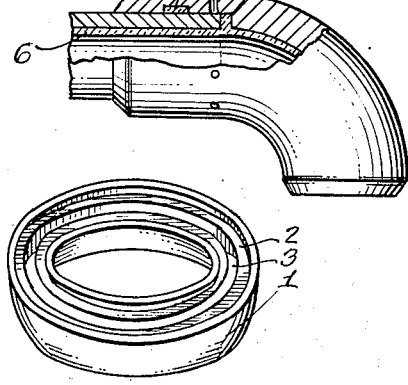
Figure 9:
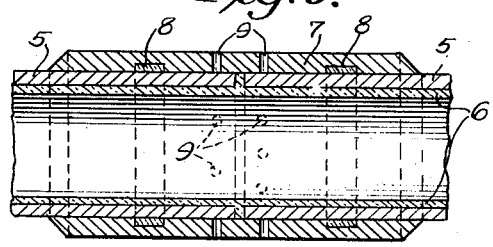

Stated in brief, the method of coating the pipe end comprises the use of a mold into which enamel or "glass" is placed. The mold is then applied to the end of the pipe and by heat and pressure the enamel in the mold is shaped against, and adhered to, the raw metal edge of the pipe and fused to the ceramic lining of the pipe. The article of manufacture used in connection with this method will be more particularly described below and is clearly shown on the drawings accompanying this application, in which Figures 1, 2, and 3 each show a cross section of an exemplification of the mold; Figure 4 shows in longitudinal section the mold illustrated in Figure 2 being used in accordance with the disclosed method of coating the raw edge of a pipe. Figure 5 shows an enlarged longitudinal fragmentary sectional view of the end of a pipe to which the disclosed method has been applied and to which the mold lining still adheres; Figure 6 illustrates in longitudinal section the pipe end shown in Figure 5 from which the element 4 has been removed; Figure 7 shows a fragmentary longitudinal section of a pipe joint being assembled; Figure 8 shows the section shown in Figure 7 showing the pipe joint as completed. Figure 9 is a longitudinal section of a pipe joint made with a plain sleeve where the two pipe ends abut each other and Figure 10 shows a perspective view of device of Figure 2 showing the element 1 as an annular element of U section in which the "Cristobalite" is formed to carry the lining 4 and enamel 3.

Reference numbers used in the several figures of the drawing refer to the same element in each case and are listed herewith for ready reference:

(1) Metal shell forming the strength element of the mold
(2) Plaster-like investment material
(3) Ceramic material such as "porcelain" or vitreous enamel (of a similar composition to the lining of the pipe)
(4) Insert for the mold comprising a material to which the enamel will adhere when fused
(5) The metal wall of a pipe
(6) The vitreous enamel lining of the pipe
(7) A sweat-type pipe coupling
(8) Solder
(9) Vent holes
(10) Adhesive In order to protect the raw edges of an enamel lined pipe which have been cut off in order to fit it to a coupling, it is desirable to coat such ends with an enamel of similar composition to the lining such as "Glass Alloy," "Perma Glass" or "Glasscote." It is not feasible to apply a coating to the raw cut end of a pipe in the field except by use of the herein disclosed method. Even in the shop coating such a pipe end by previously known methods gives rise to difficulties, for instance:

(a) The enamel in a liquid state which is necessary during its application tends to pull thin over any sharp or sharply rounded edge due to the surface tension of the material, (b) The shape of the meniscus around the end will not be uniform and would not give a uniform and closely fitted joint when two pipe ends are aligned and butted, (c) Thick enamel tends to shear off and may again expose the metal. It is therefore desirable to control the thickness of the coating more exactly than is usual in known shop practice. This coating should be held to the minimum consistent with complete coverage of the metal.

Enamel can be molded by pressing the molten enamel into a mold made of a material to which the enamel will not adhere. The present invention contemplates use of a mold to press a measured amount of enamel into a predetermined shape against the raw edge of a pipe.

It is desirable but not essential that the enamel so applied to the end of the pipe have a lower melting point than the enamel used originally as a lining, especially where it is desired to make pipe joints in accordance with the present method. This method contemplates the fusion of the enamel applied on the end of the pipe to the enamel of similar melting point which has been applied to a pipe fitting or to another piece of pipe.

Figure 1:
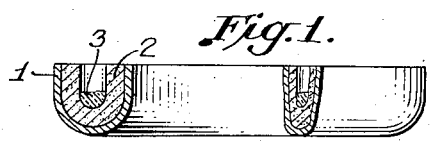
Figure 2:
Figure 3:
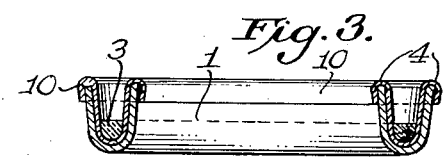

Referring to the drawings, Figures 1, 2, and 3 show an article of manufacture which may be used in practicing the method herein disclosed of coating the raw edges of pipe. Element 1 is the element provided to give structural strength to the mold. In Figures 1 and 2, Element 2 is a plaster-like material such as the investment compounds used by dentists one of which is sold under the trade name of "Cristobalite" and which may be readily formed to make the mold used in applying the enamel. Element 3 in Figures 1, 2, 3 and 4 is the enamel which is to be applied to the pipe end. In Figures 5, 6, and 7 enamel 3 is shown after application to the pipe end. In Figures 2 and 3 there appears an element 4 which forms a part of the mold and to which the enamel is fused in the shop where the molds are prepared. This makes the entire item one article of manufacture which may be used at any location and in any position. In Figure 3 the element or foil 4 is held in place in element 1 by use of an adhesive 10 at the edge. This adhesive may be "Duco" cement or other known cement or adhesive. This adhesive is destroyed when heat is applied to adhere the enamel 3 to the pipe. Element 4 is shown as very thin metal foil which may be of copper, silver, gold or any other metal which can be readily enameled. Sheet mica may also be used but it cannot readily be obtained.

The enamel 3 shown in Figure 1 is merely pulverized enamel. In the use of this exemplification the mold would preferably be used in a horizontal position to preclude the danger of movement of the enamel. The danger of such movement could be reduced by mixing the pulverized enamel with some material such as gum tragacanth.

It is desirable, in making any of these molds, that the mass of the mold be kept to a minimum, not only to save material, but to make the heating of the mold and the pipe-end as easy as possible.

In forming a pipe joint as outlined above, the first step is to cut the pipe to the correct length and the second step is to coat the pipe end with enamel 3. This coating is done by inserting the pipe element 5 with its coating 6 into the mold as shown in Figure 4. The pipe end, and mold are then heated by any means available such as an acetylene torch or blowtorch until the enamel 3 fuses against the pipe 5 and lining 6. The pipe end and mold are then permitted to cool while maintaining pressure of the mold against the pipe end. When sufficiently cooled and the mold is removed, it will be found as shown in Figure 5 that the pipe end is coated with enamel 3 which in turn is covered with metal foil 4. This metal foil is then removed by use of a fine corundum stone, wire brush, acid, etc., leaving the pipe end as shown in Figure 6.

To complete the pipe joint, a sweat-type fitting 7 as shown in Figures 7 and 8 is provided having, however, an enamel lining 6 and 3 (corresponding to enamels 6 and 3 on the pipe) which has been placed in position in the shop. Vents 9 are provided in the pipe fitting 7 to vent any pressures that may be generated in "Sweating" the fitting on the pipe. The end of the pipe which has been coated as described above is inserted in the pipe fitting and the pipe-end and fitting are heated by torch to a temperature which will melt both the solder 8 and the enamel 3. In regard to solder 8, it is recommended that this have a melting point slightly higher than enamel 3 in order that the flowing of the solder may serve as an indication of fusion of enamel 3. The enamel 3 on the pipe end and in the pipe fitting will fuse together and, with slight pressure being applied during the heating operation, will form the silver soldered "Sweat" type joint as shown in Figure 8 presenting a continuous enameled surface to the contents of the pipe.

In the exemplification of the article of manufacture shown in Figure 3, only four elements are used, the structural element 1, a metallic foil enamel support element 4, and the enamel 3 which has been fused into place in the mold and adhesive 10 securing the edges of element 4 to element 1. This exemplification has the merit of using the least possible material and requiring the least amount of heat to fuse the enamel against the pipe end but the element 1 must be made in accurate sizes whereas the exemplification shown in Figures 1 and 2 the mold may be made up in the field, even including the forming of metal element 1.

Having disclosed and described, above, a new method, and the article of manufacture for use in connection therewith, I claim as my invention:

1. An article of manufacture comprising an open sided mold lined with foil to which a charge of enamel to be molded has been fused into a solid mass.

2. A device for applying vitreous enamel in a predetermined shape to a surface said device comprising a body presenting a cavity having a surface of said predetermined shape, a lining of metal foil in said cavity and a layer of solid vitreous enamel fired to said lining on its exposed surface.

3. A device for applying vitreous enamel comprising the enamel to be applied in a solid, generally preformed state, a body having at least a portion of one face formed to receive the enamel to be applied, said portion being covered with a thin sheet of material to which said vitreous enamel is attached by fusion, said sheet of material being held against said portion of one face solely by securement to said body of the edges of said material.

4. In a device of the class described a mold body, said body including a portion formed to closely fit an article to be enameled, a recess extending from said portion to accommodate a charge of enamel to be applied to the article to be enameled, and a lining of metal foil in said recess, and a fused charge of enamel in said recess forming a solid mass adhered to and held in said mold body by said foil lining.

References Cited in the file of this patent
UNITED STATES PATENTS

| | | |
|---|---|---|
| 16,708 | Blandy | Mar. 3, 1857 |
| 301,936 | Swasey | July 15, 1884 |
| 553,907 | Genese | Feb. 4, 1896 |
| 693,830 | Burke | Feb. 25, 1902 |
| 1,497,396 | Wry | June 10, 1924 |
| 1,662,365 | Comstock | Mar. 13, 1928 |
| 1,847,557 | Gerderes | Mar. 1, 1932 |
| 1,857,213 | Poundstone | May 10, 1932 |
| 1,979,470 | Johnston | Nov. 6, 1934 |
| 1,994,668 | Russell | Mar. 19, 1935 |
| 2,040,092 | Leedy | May 12, 1936 |
| 2,241,818 | Johnston Jr. | May 13, 1941 |
| 2,349,920 | Welcome | May 30, 1944 |
| 2,384,324 | Martin | Sept. 4, 1945 |
| 2,424,353 | Essig | July 22, 1947 |
| 2,540,052 | Martin | Jan. 30, 1951 |
| 2,629,135 | Johnson | Feb. 24, 1953 |
| 2,673,371 | Uhlig | Mar. 30, 1954 |
| 2,697,676 | Black et al. | Dec. 21, 1954 |